(12) United States Patent
Schwenter et al.

(10) Patent No.: US 11,906,339 B2
(45) Date of Patent: Feb. 20, 2024

(54) CORIOLIS MEASURING TRANSDUCER AND CORIOLIS MEASURING DEVICE

(71) Applicant: Endress+Hauser Flowtec AG, Reinach (CH)

(72) Inventors: Benjamin Schwenter, Breitenbac (CH); Marc Werner, Grenzach-Wyhlen (DE); Claude Hollinger, Aesch (CH); Gebhard Gschwend, Allschwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 180 days.

(21) Appl. No.: 17/599,270

(22) PCT Filed: Feb. 14, 2020

(86) PCT No.: PCT/EP2020/053907
§ 371 (c)(1),
(2) Date: Sep. 28, 2021

(87) PCT Pub. No.: WO2020/193006
PCT Pub. Date: Oct. 1, 2020

(65) Prior Publication Data
US 2022/0316929 A1 Oct. 6, 2022

(30) Foreign Application Priority Data
Mar. 25, 2019 (DE) .................. 10 2019 107 601.3

(51) Int. Cl.
*G01F 1/84* (2006.01)
(52) U.S. Cl.
CPC .......... *G01F 1/8427* (2013.01); *G01F 1/8422* (2013.01)

(58) Field of Classification Search
CPC .................. G01F 1/8427; G01F 1/8422
(Continued)

(56) References Cited

U.S. PATENT DOCUMENTS

| 4,187,721 A | 2/1980 | Smith |
| 4,777,833 A | 10/1988 | Carpenter |

(Continued)

FOREIGN PATENT DOCUMENTS

| CN | 88102107 A | 11/1988 |
| CN | 1112373 A | 11/1995 |

(Continued)

*Primary Examiner* — Alexander A Mercado
*Assistant Examiner* — Rodney T Frank
(74) *Attorney, Agent, or Firm* — Kelly J. Smith; Endress+Hauser (USA) Holding, Inc.

(57) ABSTRACT

The invention relates to a Coriolis measuring transducer of a Coriolis measuring device comprising: at least one measuring tube; at least one exciter; at least two sensors; wherein at least one exciter or at least one sensor has a coil device and a magnet device, wherein the magnet device has a holder and at least a first magnet group and at least a second magnet group, wherein the holder has a body with a body length axis and a first end and a second end wherein the first end has an end surface, wherein the body has three recesses, wherein a central recess is separated, in each case, from an outer recess by, in each case, an intermediate wall, wherein each intermediate wall has an opening, and wherein the first magnet group is arranged in a first opening, and wherein the second magnet group is arranged in a second opening.

14 Claims, 4 Drawing Sheets

(58) Field of Classification Search
USPC .................................................. 73/861.354
See application file for complete search history.

(56) References Cited

U.S. PATENT DOCUMENTS

| | | | |
|---|---|---|---|
| 4,811,606 A | 3/1989 | Hasegawa et al. | |
| 5,115,683 A | 5/1992 | Pratt | |
| 5,349,872 A | 9/1994 | Kalotay et al. | |
| 2002/0157480 A1* | 10/2002 | Bitto | G01F 1/8427 |
| | | | 73/861.355 |
| 2006/0081069 A1* | 4/2006 | Bitto | G01F 1/8477 |
| | | | 73/861.355 |
| 2011/0138930 A1 | 6/2011 | Hussain et al. | |
| 2012/0304731 A1* | 12/2012 | Lammerink | G01F 1/8445 |
| | | | 73/1.16 |

FOREIGN PATENT DOCUMENTS

| | | |
|---|---|---|
| CN | 1168970 A | 12/1997 |
| CN | 102980621 A | 3/2013 |
| DE | 102015120087 A1 | 5/2017 |
| DE | 202017006709 U1 | 3/2018 |
| EP | 1719983 A1 | 11/2006 |
| JP | 1151733 A | 6/1989 |
| JP | 1151733 A | 2/1999 |
| JP | 5922291 B1 | 5/2016 |
| WO | 2005073676 A1 | 8/2005 |

\* cited by examiner

CORIOLIS MEASURING TRANSDUCER AND CORIOLIS MEASURING DEVICE

CROSS-REFERENCE TO RELATED APPLICATIONS

The present application is related to and claims the priority benefit of German Patent Application No. 10 2019 107 601.3, filed on Mar. 25, 2019, and International Patent Application No. PCT/EP2020/053907, filed on Feb. 14, 2020, the entire contents of which are incorporated herein by reference.

TECHNICAL FIELD

The invention relates to a Coriolis measuring transducer of a Coriolis measuring device for registering mass flow or density of a medium flowing through at least one measuring tube as well as to a Coriolis measuring device with such a Coriolis measuring transducer.

BACKGROUND

Coriolis measuring devices for measuring mass flow or density of a medium flowing through a measuring tube of the measuring device are known in the state of the art. As disclosed in DE102015120087A1, by way of example, a sensor for registering measuring tube oscillations, or an exciter for producing measuring tube oscillations, can comprise a planar coil and a U-shaped, magnetic field producing element, which surrounds the planar coil.

Disadvantageous in such a magnetic field producing element is the presence of a magnetic region, which has an unsharp transition to a spatial region without magnetic field. This results in a lower sensitivity of sensors.

Alternatively, also magnets with spatially defined magnetic field can be used. However, in this case, a simple, robust and exact seating of the magnets is challenging.

SUMMARY

An object of the invention is, consequently, to provide a Coriolis measuring transducer as well as a Coriolis measuring device, in the case of which such a seating of magnets is accomplished.

The object is achieved by a Coriolis measuring transducer as defined in independent claim 1 as well as by a Coriolis measuring device as defined in independent claim 15.

A Coriolis measuring transducer of the invention for a Coriolis measuring device for registering mass flow or density of a medium flowing through at least one measuring tube comprises:

the at least one measuring tube, which has an inlet and an outlet and which is adapted to convey the medium between inlet and outlet;
- a support body, which is adapted to hold the at least one measuring tube,
- at least one exciter, which is adapted to excite the at least one measuring tube to execute oscillations;
- at least two sensors, which are adapted to register oscillations of the at least one measuring tube;
- wherein at least one exciter and/or at least one sensor have/has, in each case, a coil device with, in each case, at least one coil, as well as, in each case, a magnet device, wherein the magnet device and the coil device are movable relative to one another, wherein the magnet device has a holder and at least a first magnet group having at least one magnet and at least a second magnet group having at least one magnet, wherein the holder has a body with a body length axis and a first end and a second end, wherein the first end has an end surface, wherein the body has three recesses, which extend plan-parallel to one another and perpendicularly to the end surface, wherein a central recess is separated from outer recesses by intermediate walls, wherein each intermediate wall has an opening, wherein the openings lie opposite one another across the central recess, wherein the coil device is arranged at least sectionally in the central recess, and wherein the first magnet group is arranged in a first opening, and wherein the second magnet group is arranged in a second opening.

A holder as proposed here can be produced especially easily and cost effectively by means of milling and enables a precise and robust positioning of the magnet groups in the openings.

In an embodiment, the openings extend from the end surface.

In an embodiment, the magnet groups are held in their openings by means of adhesive, wherein the adhesive is especially a ceramic adhesive.

In an embodiment, each magnet group includes two magnets and at least one magnetically conductive, especially ferromagnetic, bridge element, wherein the magnetic fields of the two magnets are oppositely oriented, and wherein the bridge element is adapted to guide and to bring together field lines of the magnetic fields of the two magnets, wherein the magnets are mechanically in contact with the bridge element, wherein magnetic fields of oppositely lying magnets of different magnet groups are equally directed, and wherein the bridge element is arranged on a side of the magnet group facing away from the respectively other magnet group.

In an embodiment, the at least one coil includes a central region and a winding region surrounding the central region, wherein, in a resting state of the at least one measuring tube, a boundary between the magnets of a magnet group projected onto the cross sectional plane is located at least sectionally in the central region, and wherein the magnets of a magnet group are arranged one after another in an oscillation direction.

In an embodiment, the holder is made of a non-magnetic material, such as, for example, a stainless steel, such as, for example, 316L or SS420 or aluminum, copper, titanium or a plastic and has especially a mass density less than 8 g/cm^3.

In an embodiment, the holder is securable to a measuring tube or to an anchorage.

In an embodiment, the outer recesses are bounded by outer walls, wherein each magnet group is supported by an associated outer wall.

In an embodiment, the coil of an exciter is adapted to supply its magnet device with a force, and wherein the magnet device of a sensor is adapted to induce an electrical voltage in the coil of its coil device.

In an embodiment, the measuring transducer includes two manifolds, wherein a first manifold is adapted on an upstream side of the measuring transducer to receive a medium entering from a pipeline into the measuring transducer and to convey such to the inlet of the at least one measuring tube,
wherein a second manifold is adapted to receive the medium emerging from the outlet of the at least one measuring tube and to convey such back into the pipeline.

In an embodiment, the measuring transducer includes two process connectors, especially flanges, which are adapted to connect the measuring transducer with a pipeline.

In an embodiment, the magnet device is connected mechanically with its measuring tube, and wherein the coil device is secured translationally as well as rotationally relative to the inlet and the outlet.

In an embodiment, the measuring transducer has one measuring tube, wherein the holder/the coil device of the sensor, or exciter, is secured, in each case, to the measuring tube, and
wherein the coil device/the holder of the sensor, or exciter, is secured, in each case, to the support body, or
wherein the sensor has a measuring tube pair, wherein the holder/the coil device of the sensor, or exciter, is secured, in each case, to a first measurement tube, and the coil device/the holder, is secured, in each case, to a second measuring tube.

In an embodiment, the measuring transducer has two measuring tube pairs.

A Coriolis measuring device of the invention comprises:
a Coriolis measuring transducer as set forth in one of the preceding embodiments;
an electronic measuring/operating circuit, wherein the electronic measuring/operating circuit is adapted to operate the exciter as well as the sensors,
wherein the electronic measuring/operating circuit is further adapted to ascertain flow measured values and/or density measured values, and,
wherein the measuring device especially has an electronics housing for housing the electronic measuring/operating circuit.

BRIEF DESCRIPTION OF THE DRAWINGS

The invention will now be described based on examples of embodiments presented in the appended drawing, the figures of which show as follows.

DETAILED DESCRIPTION

Figure 1:
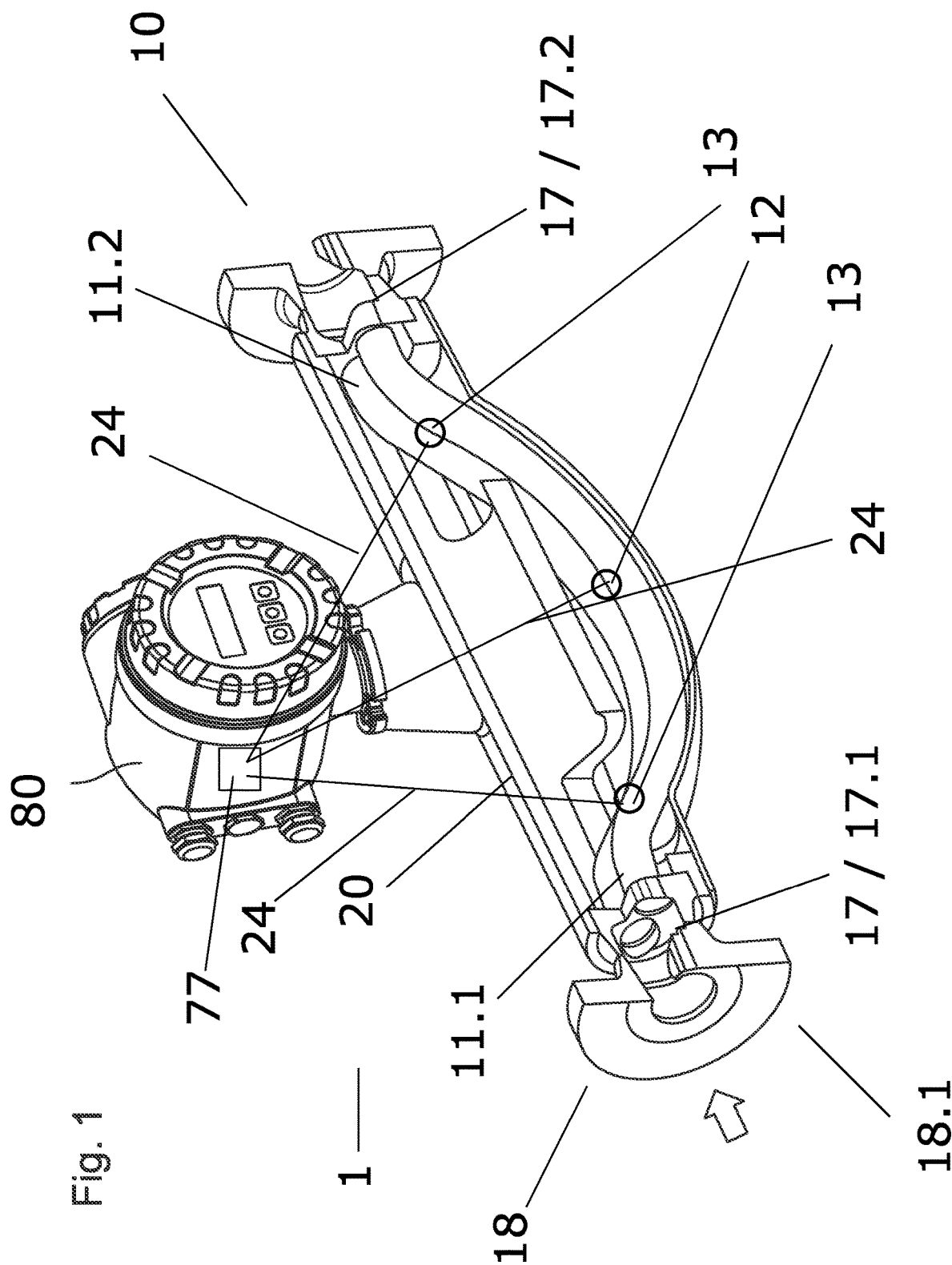
FIG. 1 shows a Coriolis measuring device 1 having an example of a Coriolis measuring transducer of the present disclosure.

FIG. 1 shows by way of example a Coriolis measuring device 1 of the invention having an example of a Coriolis measuring transducer 10 of the invention. The measuring transducer includes a support body 20 and two measuring tubes, each of which has an inlet 11.1 and an outlet 11.2. The measuring transducer includes, furthermore, an exciter 12 for exciting measuring tube oscillations and two sensors 13 for registering measuring tube oscillations. The Coriolis measuring device further includes an electronics housing 80, in which an electronic measuring/operating circuit 77 is arranged, which is adapted to operate the exciter as well as the sensors and to provide measured values of a medium flowing through the measuring tubes. The exciter as well as the sensors are connected with the electronic measuring/operating circuit 77 by means of electrical connections 24.

The measuring transducer can, such as shown in this case, have two manifolds 17, wherein a first manifold 17.1 on an upstream side of the measuring transducer is adapted to receive a medium entering from a pipeline into the measuring transducer and to convey such to the inlet of the at least one measuring tube, wherein a second manifold 17.2 is adapted to receive the medium emerging from the outlet of the at least one measuring tube and to convey such back into the pipeline.

Measuring transducers usually have, such as shown in this case, two process connectors 18, especially flanges 18.1, which are adapted to connect a measuring transducer with a pipeline.

The embodiment shown here is by way of example. Thus, a measuring transducer can also have, for example, only one measuring tube or more than two measuring tubes.

Figure 2:
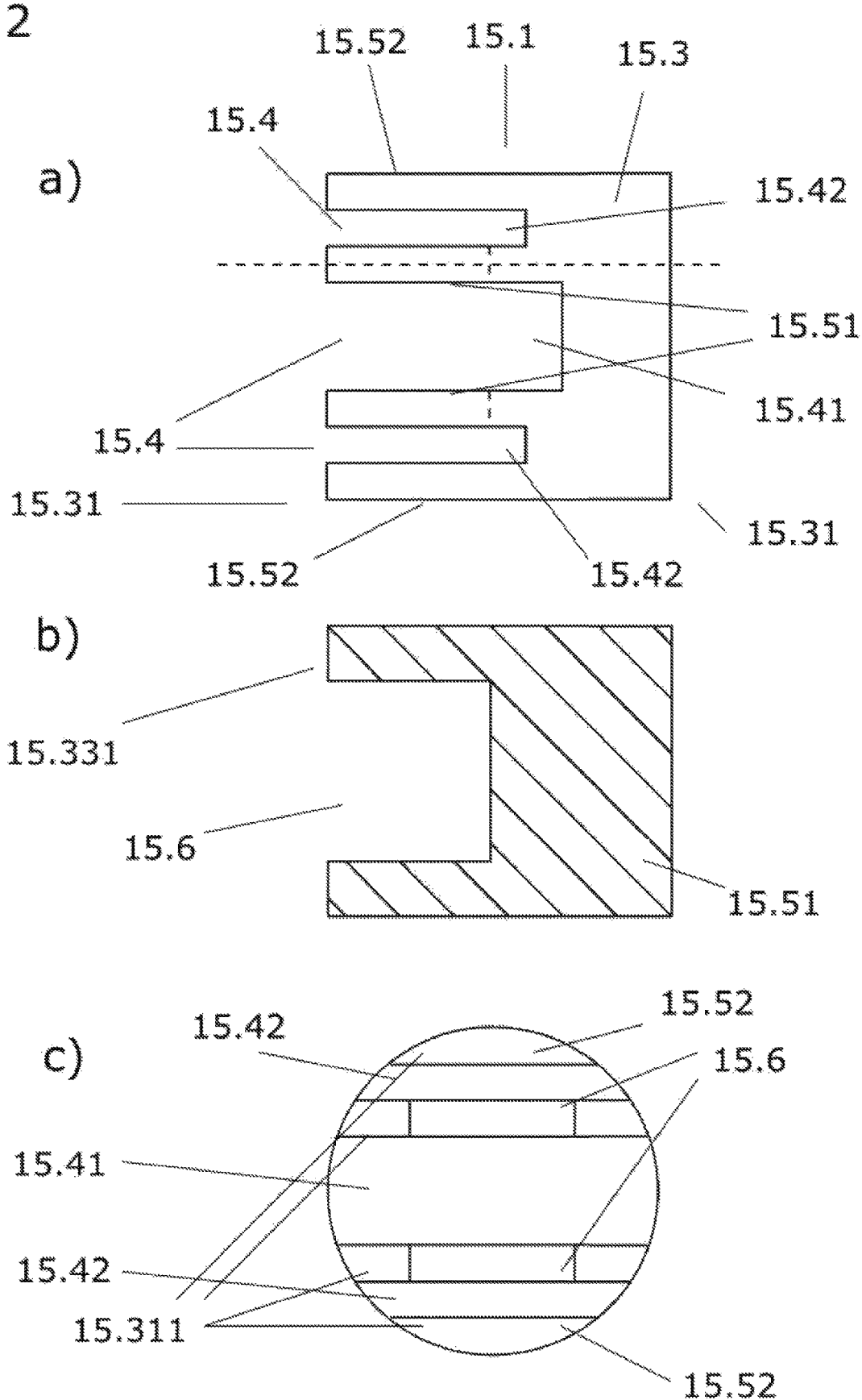
FIGS. 2a) to c) show views by way of example of a holder of the invention for a magnet device.

FIG. 2 a) shows a side view of an example of the holder 15.1 of the invention for a magnet device 15, wherein the holder comprises a body 15.3 with three recesses 15.4, which extend planparallel to one another and perpendicular to an end surface 15.311, wherein a central recess 15.41 is separated, in each case, by an intermediate wall 15.51 from, in each case, an outer recess 15.42.

The end surface is arranged at a first end 15.31 of the body. The body can be secured to a measuring tube or to an anchorage by means of a second end 15.32 opposite the first end. Suitable means of securement are, for example, an adhesive-, welded- or screwed assembly (not shown).

FIG. 2 b) shows a longitudinal section of an intermediate wall 15.51 of the body. The intermediate walls 15.51 have, in each case, an opening 15.6, which, especially as shown in this case, extends from the end surface 15.311.

FIG. 2 c) shows a plan view of the end surface 15.311 of the body. The openings 15.6 of the partitions are visible in this view. In such case, it is evident that the recesses as well as the openings can be cut into the body especially easily and precisely by milling. Thus, roundings on ends, which can occur in the case of milling due to a finite milling head diameter, can be avoided and precisely defined ends made.

Figure 3:
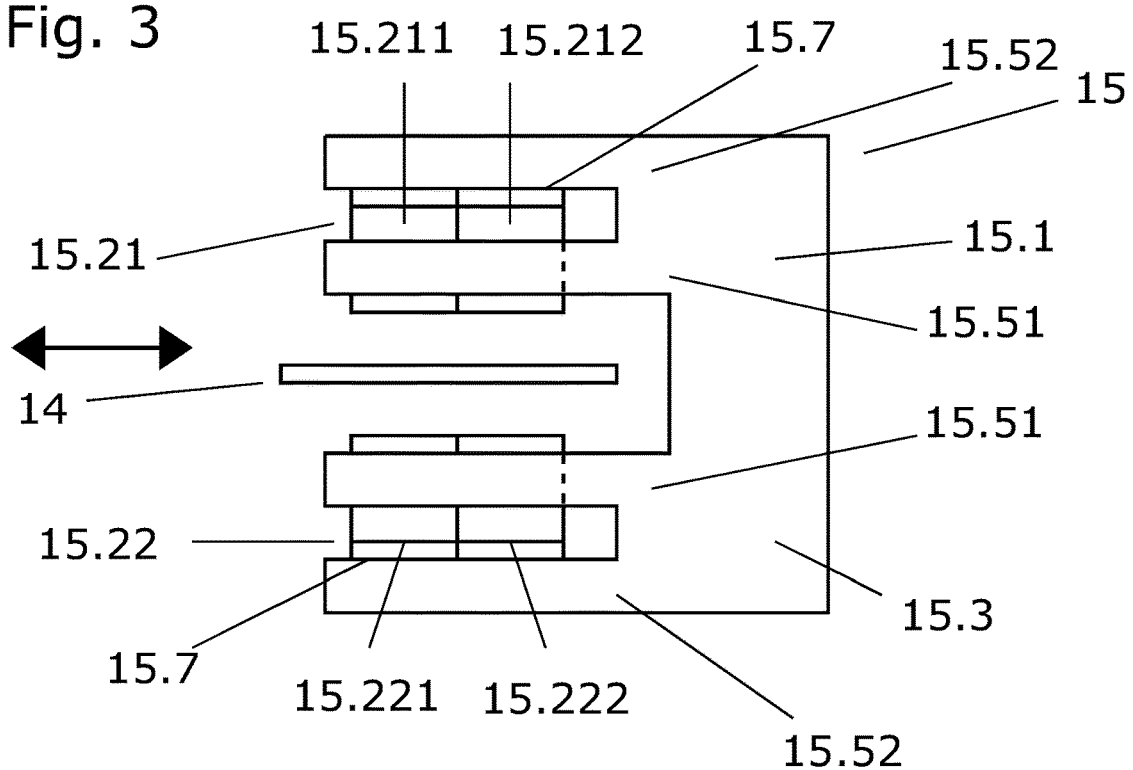
FIG. 3 shows a side view of a magnet device with an example of a holder of the present disclosure.

FIG. 3 shows a side view of a magnet device, comprising the holder 15.1 shown in FIG. 2 a) to c), into which a first magnet group 15.21 and a second magnet group 15.22 are introduced. The two magnet groups have, in each case, a first magnet 15.211/15.221 and a second magnet 15.212/15.222, wherein the magnetic fields of the two magnets of a particular magnet group are oppositely oriented. Opposite magnets of different magnet groups have equal magnetic field orientation. In this way, there arises between the first magnets and the second magnets a sharp magnetic field edge. On the outer wall 15.52 facing, rear faces of the magnets of a magnet group, a magnetic circuit bridge element 15.7, especially a ferromagnetic circuit bridge element, is arranged, which is adapted to close the field lines of the magnets belonging to the relevant magnet group and, thus, to provide a higher magnetic flux.

The magnet groups are, in such case, arranged in the openings of the intermediate walls 15.51. Preferably, geometric dimensions of a magnet group as well as its opening are matched to one another such that the magnet group is secured without significant play on three sides by a border of the cavity. The magnet group with bridge element, in such case, also contacts its outer wall 15.52. In this way, the magnet group can be safely and precisely positioned. The magnet groups are, in such case, in each case, held in their openings by means of an adhesive, wherein the adhesive is especially a ceramic adhesive.

The body is preferably produced from a non- or scarcely magnetic and, especially, 3D-printable material, such as, for example, a stainless steel, aluminum, ceramic, or plastic.

Indicated in FIG. 3 is the positioning of a coil device 14 as well as a direction of a relative movement caused by a measuring tube oscillation. Further detailing of this is provided in the description of FIG. 4.

Other than as shown in this case, a magnet device can also have magnet groups with each having only one magnet.

Figure 4:
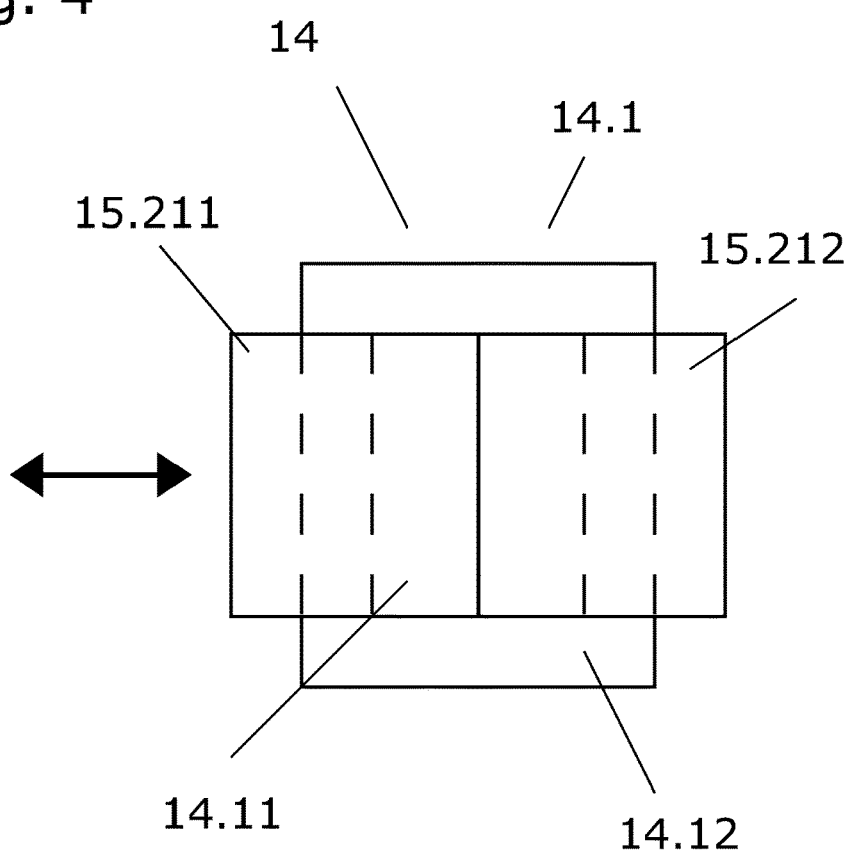
FIG. 4 shows schematically, an arrangement of a magnet group relative to a coil in the resting state of a measuring tube.

FIG. 4 shows a positioning of a first magnet group with two magnets 15.211/15.212 relative to a coil device 14 having a coil 14.1. The coil includes a central region 14.11 and a winding region surrounding the central region. In a resting state of the at least one measuring tube, a boundary between the magnets of a magnet group projected onto the cross sectional plane is located preferably at least approximately in a center of the central region.

Preferably, the central region of the coil has in the direction of the relative movements caused by measuring tube oscillations an extent, which is greater than oscillation amplitudes typical for the measuring tube, and which is less than two times a typical oscillation amplitude.

The boundary between the magnets extends, in such case, preferably perpendicularly to the direction of the relative movement. Relative movements between coil and magnet device bring about a strong induction of electrical voltages in the coil.

In the case of a single tube, Coriolis measuring transducer, the holder 15.1 of a sensor or exciter is preferably arranged on the measuring tube, and the coil device of a sensor or exciter is preferably arranged by means of a securement apparatus on the support body 20.

In the case of a two tube, Coriolis measuring transducer, the holder of a sensor or exciter is preferably secured to a first measurement tube and the coil device of a sensor or exciter is preferably secured to a second measuring tube.

Figure 5:
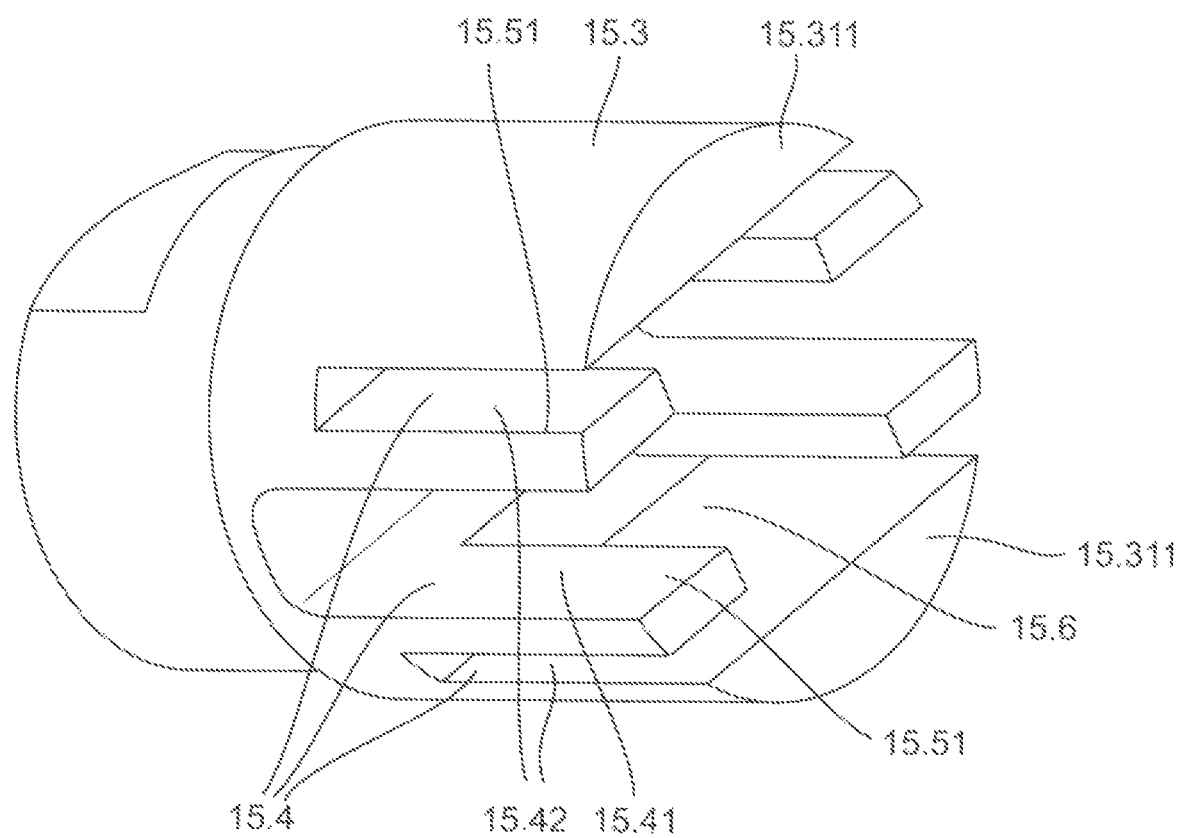
FIG. 5 shows by way of example, a perspective view of the holder of FIGS. 2 a) to c).

FIG. 5 shows a perspective view of the body 15.3 of FIG. 2 *a*) to 2 *c*) with an end surface 15.311 and recesses 15.4, which are separated from one another by the intermediate walls 15.51. The intermediate walls have openings 15.6, in which magnet groups are positionable, such as described above.

The invention claimed is:

1. A Coriolis measuring transducer for a Coriolis measuring device for registering mass flow or density of a medium flowing through at least one measuring tube, comprising:
the at least one measuring tube, which has an inlet and an outlet and which is adapted to convey the medium between the inlet and the outlet;
a support body, which is adapted to hold the at least one measuring tube,
at least one exciter, which is adapted to excite the at least one measuring tube to execute oscillations;
at least two sensors, which are adapted to register oscillations of the at least one measuring tube;
wherein at least one exciter and/or at least one sensor have/has, in each case, a coil device with, in each case, at least one coil, as well as, in each case, a magnet device, wherein the magnet device and the coil device are movable relative to one another,
wherein the magnet device has a holder and at least a first magnet group having at least one magnet and at least a second magnet group having at least one magnet,
wherein the holder has a body with a body length axis and a first end and a second end, wherein the first end has an end surface,
wherein the body has three recesses, which extend planparallel to one another and perpendicularly to the end surface, wherein a central recess is separated from outer recesses by intermediate walls,
wherein each intermediate wall has an opening, wherein the openings lie opposite one another across the central recess,
wherein the coil device is arranged at least sectionally in the central recess, and wherein the first magnet group is arranged in a first opening, and wherein the second magnet group is arranged in a second opening.

2. The Coriolis measuring transducer as claimed in claim 1,
wherein the openings extend from the end surface.

3. The Coriolis measuring transducer as claimed in claim 1,
wherein the magnet groups are held in their openings by means of an adhesive, wherein the adhesive is a ceramic adhesive.

4. The Coriolis measuring transducer as claimed in claim 1, wherein each magnet group includes two magnets and at least one magnetically conductive, ferromagnetic, bridge element,
wherein the magnetic fields of the two magnets are oppositely oriented, and wherein the bridge element is adapted to guide and to bring together field lines of the magnetic fields of the two magnets,
wherein the magnets are mechanically in contact with the bridge element,
and
wherein the bridge element is arranged on a side of the magnet group facing away from the respectively other magnet group.

5. The Coriolis measuring transducer as claimed in claim 4,
wherein the at least one coil includes a central region and a winding region surrounding the central region,
wherein, in a resting state of the at least one measuring tube, a boundary between the magnets of a magnet group projected onto the cross sectional plane is located at least sectionally in the central region, and
wherein the magnets of a magnet group are arranged one after another in an oscillation direction.

6. The Coriolis measuring transducer as claimed in claim 1, wherein the holder is made of a non-magnetic material and has a mass density less than 8 g/cm^3.

7. The Coriolis measuring transducer as claimed in claim 1,
wherein the outer recesses are bounded by outer walls,
wherein each magnet group is supported by an associated outer wall.

8. The Coriolis measuring transducer as claimed in claim 1,
wherein the coil of an exciter is adapted to supply its magnet device with a force, and wherein the magnet device of a sensor is adapted to induce an electrical voltage in the coil of its coil device.

9. The Coriolis measuring transducer as claimed in claim 1, wherein the measuring transducer includes two manifolds, wherein a first manifold is adapted on an upstream side of the measuring transducer to receive a medium entering from a pipeline into the measuring transducer and to convey such to the inlet of the at least one measuring tube, wherein a second manifold is adapted to receive the medium emerging from the outlet of the at least one measuring tube and to convey such back into the pipeline.

10. The Coriolis measuring transducer of claim 1, wherein the measuring transducer includes two process connectors, which are adapted to connect the measuring transducer with a pipeline.

11. The Coriolis measuring transducer as claimed in claim 1,
wherein the magnet device is connected mechanically with it's the at least one measuring tube, and wherein the coil device is secured translationally as well as rotationally relative to the inlet and the outlet.

12. The Coriolis measuring transducer as claimed in claim 1, wherein the measuring transducer has the at least one measuring tube, wherein the holder/the coil device of the sensor, or exciter, is secured, in each case, to the at least one measuring tube, and wherein the coil device/the holder of the sensor, or exciter, is secured, in each case, to the support body, or wherein the sensor has a measuring tube pair of the at least one measuring tube, wherein the holder/the coil device of the sensor, or exciter, is secured, in each case, to a first measurement tube of the at least one measuring tube, and the coil device/the holder, is secured, in each case, to a second measuring tube of the at least one measuring tube.

13. The Coriolis measuring transducer as claimed in claim 11, wherein the measuring transducer has two measuring tube pairs of the at least one measuring tubes.

14. A Coriolis measuring device comprising:
a Coriolis measuring transducer as claimed in claim 1;
an electronic measuring/operating circuit, wherein the electronic measuring/operating circuit is adapted to operate the exciter as well as the sensors,
wherein the electronic measuring/operating circuit is further adapted to ascertain flow measured values and/or density measured values, and,
wherein the measuring device has an electronics housing for housing the electronic measuring/operating circuit.

* * * * *